United States Patent
Dziedzic et al.

(10) Patent No.: US 7,132,090 B2
(45) Date of Patent: Nov. 7, 2006

(54) SEQUESTRATION OF CARBON DIOXIDE

(75) Inventors: Daniel Dziedzic, Rochester Hills, MI (US); Kenneth B Gross, Troy, MI (US); Robert A Gorski, Sterling Heights, MI (US); John T Johnson, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 482 days.

(21) Appl. No.: 10/428,533

(22) Filed: May 2, 2003

(65) Prior Publication Data

US 2004/0219090 A1 Nov. 4, 2004

(51) Int. Cl.
B01D 53/04 (2006.01)
(52) U.S. Cl. .................... 423/230; 423/419.1
(58) Field of Classification Search ........... 423/430, 423/230
See application file for complete search history.

(56) References Cited

U.S. PATENT DOCUMENTS

| | | | |
|---|---|---|---|
| 4,602,987 A | 7/1986 | Bonaventura et al. | |
| 4,623,330 A * | 11/1986 | Laby et al. | 604/63 |
| 4,761,209 A | 8/1988 | Bonaventura et al. | |
| 6,143,556 A | 11/2000 | Trachtenberg | |
| 6,251,356 B1 * | 6/2001 | Mathur | 423/432 |
| 6,890,497 B1 * | 5/2005 | Rau et al. | 423/220 |
| 2001/0022952 A1 | 9/2001 | Rau et al. | |
| 2003/0017088 A1 | 1/2003 | Downs et al. | |
| 2003/0027023 A1 | 2/2003 | Dutil et al. | |
| 2003/0033932 A1 | 2/2003 | Sirkar et al. | |

OTHER PUBLICATIONS

Bond, M. G., et al., CO2 Capture from Coal-Fired Utility Generation Plant Exhausts, and Sequestration by a Biomimetic Route Based on Enzymatic Catalysis-Current Status, First National Conference on Carbon Sequestration, 2001.*
Annual Report, $CO_2$ Solution Website (2001), http://www.$CO_2$solutions.com/a 01 tec.html (downloaded Mar. 14, 2002).
Bond, Gillian M. et al., "Capturing and Sequestering $CO_2$ Nature's Way: Biomimetic Approaches," Department of Energy Website (downloaded 2001).
Bond, Gillian M. et al., "$CO_2$ Capture from Coal-Fired Utility Generation Plant Exhausts, and Sequestration by a Biomimetic Route Based on Enzymatic Catalysis-Current Status," Department of Energy Website (downloaded 2001).

(Continued)

*Primary Examiner*—Colleen P. Cooke
*Assistant Examiner*—Rebecca M. Stadler
(74) *Attorney, Agent, or Firm*—Kathryn A. Marra

(57) ABSTRACT

A process for selectively removing carbon dioxide from a gaseous stream by converting the carbon dioxide to a solid, stable form is provided. In a sequestration process, carbon dioxide enriched air is passed through a gas diffusion membrane to transfer the carbon dioxide to a fluid medium. The carbon dioxide rich fluid is then passed through a matrix containing a catalyst specific for carbon dioxide, which accelerates the conversion of the carbon dioxide to carbonic acid. In the final step, a mineral ion is added to the reaction so that a precipitate of carbonate salt is formed. This solid mineral precipitate can be safely stored for extended periods of time, such as by burying the precipitate in the ground or depositing the precipitate into storage sites either on land or into a body of water. An apparatus for removing carbon dioxide from a gaseous stream is also provided.

18 Claims, 3 Drawing Sheets

OTHER PUBLICATIONS

Bond, Gillian M. et al., "Development of Integrated System for Biomimetic $CO_2$ Sequestration Using the Enzyme Carbonic Anhydrase," Energy & Fuels, vol. 15, No. 2, 309-316 (2001).

Dunsmore, H.E., "A Geological Perspective on Global Warming and the Possibility of Carbon Dioxide Removal as Calcium Carbonate Mineral," Energy Convers. Mgmt., vol. 33, No. 5-8, pp. 565-572 (1992).

Ge, J.-J., "Enzyme-Based Facilitated Transport: Use of Vacuum Induced Sweep for Enhanced $CO_2$ Capture," SAE Technical Paper Series, 2001-01-2305, 31st International Conference on Envrionmental Systems, Jul. 9-12, 2001.

Hsu, C. H. et al., "Absorption and Reaction Kinetics of Amines and Ammonia Solutions with Carbon Dioxide in Flue Gas," ISSN 1047-3289, J. Air & Waste Manage. Assoc., vol. 53, 246-252 (2003).

Jolly, Clifford D. et al., "Application of biocatalysts to Space Station ECLSS and PMMS Water Reclamation," Society of Automotive Engineers, No. 891442, pp. 1-5 (1989).

Lackner, K. S., "Carbonate Chemistry for Sequestering Fossil Carbon," Annu. Rev. Energy Environ., vol. 27, pp. 193-232 (2002). ACS meeting abstracts for the 225th meeting of the American Chemical Society, Mar. 23-27, 2003, downloaded from www.acs.org.

Rau, Greg H. et al., "Ehanced carbonate dissolution: a means of sequestering waste $CO_2$ as ocean bicarbonate," Energy Conversion & Management, vol. 40, pp. 1803-1813 (1999).

Simsek-Ege, Fatma A. et al., "Polyelectrolyte Cages for a Novel Biomimetic $CO_2$ Sequestration System," Fuel Chemistry Division Preprints, 46(1), pp. 56-60 (2001).

Smith, Dr. Russell L. et al., "Enzyme Facilitated Transport Membrans," Department of Energy Website, http://www.er.doe.gov/sbir/Awards_Abstracts/sbir/cycle15/phase1/29.htm.

Trachtenberg, Michael C. et al., "Carbon Dioxide Transport by Proteic and Facilitated Transport Membranes," Life Support & Biosphere Science, vol. 6, pp. 293-302 (1999).

Trachtenberg, Michael et al., "Efficient $CO_2$ Separation by Enzyme-Based Facilitated Transport," North American Membran Society Website, p. 1 (2001), http://www.che.utoledo.edu/nams/2001/viewpaper.cfm?ID=48 (downloaded Mar. 20, 2002).

VanderWiel, D. P., "Carbon Dioxide Conversions in Microreactors," Pacific Northwest National Laboratory, pp. 1-6.

Xu, Z. et al., "Separation and Fixation of Carbon Dioxide Using Polymeric Membrane Contactor," Netl Publications 2001 Conference Proceedings, 1st National Conference on Carbon Sequestration, May 14-17, downloaded from www.netl.doe.gov.

\* cited by examiner

SEQUESTRATION OF CARBON DIOXIDE

TECHNICAL FIELD AND INDUSTRIAL APPLICABILITY OF THE INVENTION

The present invention relates generally to the selective removal of carbon dioxide and more particularly to the selective removal of carbon dioxide from oxidation of fossil fuels by converting the carbon dioxide to a solid, or otherwise stable form.

BACKGROUND OF THE INVENTION

Carbon dioxide ($CO_2$) emissions have been identified as a major contributor to the phenomenon of global warming. $CO_2$ is a by-product of combustion and it creates operational, economic, and environmental problems. It is a reaction product without any fuel value, and is an environmental concern since it is the principal greenhouse gas. In addition, because it is an acid gas, $CO_2$ forms carbonic acid in the presence of water, which is corrosive in nature. The removal of this greenhouse gas from the exhaust stream of fossil-fueled industrial processes is a major ecological and economic issue. Moreover, there are no current practical processes for removing $CO_2$ from gaseous streams. As one example, a current process for the removal of $CO_2$ from gaseous emissions purifies the $CO_2$ to a high concentration (e.g., 70–100%), compresses it, and injects it into oil wells as a compressed gas. However, the compressed and highly concentrated toxic $CO_2$ has the potential to escape back into the air. Thus, no method or device for removing $CO_2$ from the exhaust stream of fossil-fueled power plants exists which satisfies the needs of safety, efficiency, and economy.

SUMMARY OF THE INVENTION

According to one embodiment of the present invention, there is provided a method for selectively removing $CO_2$ from a gaseous stream. In the first step, gaseous $CO_2$, such as from factory exhaust, is diffused into a stream of water by flowing the gaseous $CO_2$ through a microporous gas diffusion membrane. It is preferable that the gas diffusion membrane has a high surface area to facilitate a large flow of the gaseous $CO_2$ through the membrane. Next, the $CO_2$-rich fluid that emerges from the gas diffusion membrane is passed by a matrix that contains a catalyst specific for $CO_2$. In a preferred embodiment, carbonic anhydrase is used as the catalyst, and carbonic acid is formed. Once carbonic acid is formed, it spontaneously dissociates and forms an equilibrium with bicarbonate and carbonate ions, which is pH dependent. Base can then be added to shift the equilibrium to favor the formation of carbonate ions. In the final step, mineral ions such as calcium cations, or magnesium cations are added to the reaction so that a precipitate of carbonate salt is formed. This solid mineral precipitate is at the ground state of energy level of carbon and therefore has the ability to be safely stored for extended periods of time, such as by burying the precipitate in the ground or depositing the precipitate into storage sites either on land or into a body of water. Alternatively, the carbonic acid formed from $CO_2$ can be added to a carbonate slurry, forming bicarbonate, which is then deposited in the ocean with little environmental impact on the surroundings.

According to another embodiment of the present invention, there is provided an apparatus for selectively removing $CO_2$ from a gaseous stream. The apparatus includes a $CO_2$ diffusion module having a gas diffusion membrane to diffuse the $CO_2$ into a stream of water. It is preferable that the gas diffusion membrane has a high surface area to facilitate a large flow of $CO_2$-saturated air across the membrane. A porous matrix that includes a catalyst, such as carbonic anhydrase, is located in a conversion module. When carbonic anhydrase is used as the catalyst, the speed at which the $CO_2$ is converted to carbonic acid greatly increases. The catalyst can be coupled to the matrix by adsorptive, ionic, or covalent bonding techniques. In addition, the catalyst can be cross-linked or co-cross linked to other chemicals to enhance its activity. Further, the apparatus includes a mineralization module in which a mineral ion is added to a carbonate solution to form a precipitate of carbonate salt. Typically, cations such as, but not limited to, calcium cations, or magnesium cations are added to form the precipitate carbonate salt.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

The present invention solves the aforementioned disadvantages and problems of the prior art by providing a process for the continuous and rapid removal of carbon dioxide ($CO_2$) from the air, such as from a stationary source, and the transformation of the $CO_2$ into a stable, non-toxic form.

Figure 1:
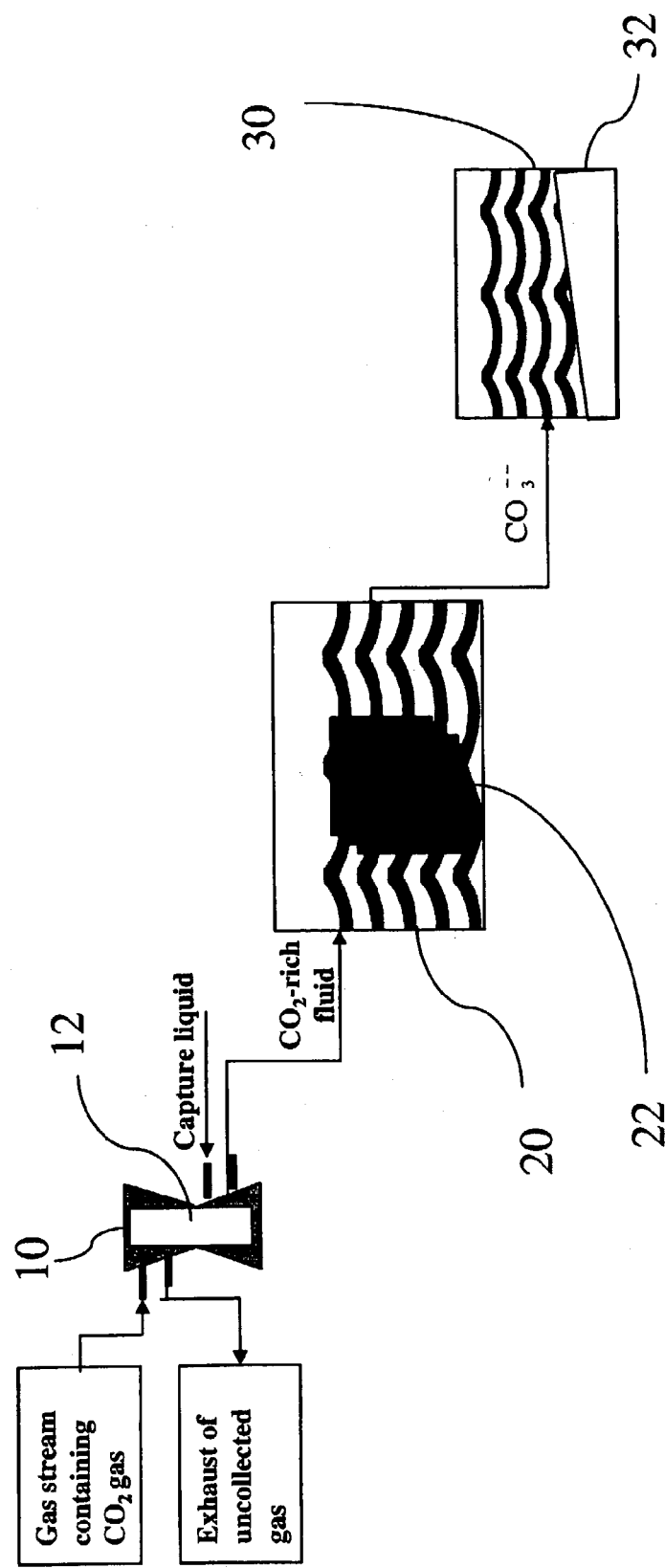
FIG. 1 is a schematic illustration of a process for the removal of $CO_2$ according to the present invention.

Referring to FIG. 1, a schematic illustration of a process according to the present invention can be seen. In the first step, gaseous $CO_2$, such as from factory exhaust, is diffused into a capturing liquid by flowing the gaseous $CO_2$ through a gas diffusion membrane (12) in a $CO_2$ capture module (10). Suitable capturing liquids include, but are not limited to, the liquids set forth in Table 1 below. Hereinafter, the process is described using water as the capturing liquid. Preferably, the gas diffusion membrane (12) has a high surface area to facilitate a large flow of the gaseous $CO_2$ through the membrane (12). Suitable membranes (12) for use in the $CO_2$ capture module (10) include a polypropylene gas exchange membrane, ePTFE (GORE-TEX), zeolites, chytosan, polyvinylpyrollindine, cellulose acetate, and immobilized liquid membranes. Other similar gas diffusion membranes (12) would be easily identified by one of skill in the art.

TABLE 1

| CAPTURING LIQUIDS |
|---|
| (+)-Limonene |
| 1,2,3-Propanetriol |
| 1,2-Dibromoethane |
| 1,2-Dichloroethane |

TABLE 1-continued

CAPTURING LIQUIDS 1,3-Dichloroisopropanol
1-Bromopentane
1-Chloro-2-methyl-propane
1-Chloropentane
1-Methylethylbenzene
1-Pentanol
1-Propanol
2-Methyl-benzenamine
3-Methyl-1-butanol
3-Methyl-benzenamine
3-Pentanol formate
Acetic acid
Acetic acid anhydride
Acetic acid, methyl ester
Acetone
Aniline
Benzaldehyde
Benzene
Benzyl chloride
Bromobenzene
Butanoic acid
Carbon disulfide
Carbon tetrachloride
Carvone
Chlorobenzene
Chloroform
Ethanol
Eugenol
Iodobenzene
Isobutyl acetate
Methanol
n-Amyl acetate
Propanoic acid
Pyridine
Toluene
Trichlorobenzene
Water In the next step, the transformation of dissolved forms of $CO_2$ to carbonic acid are accelerated in a conversion module (20). In particular, the $CO_2$ rich fluid that emerges from the gas diffusion membrane (12) is passed by a matrix (22) that contains a catalyst specific for $CO_2$, such as, but not limited to carbonic anhydrase. Examples of suitable matrixes include beads, fabrics, fibers, membranes, particulates, porous surfaces, rods, and tubes. Specific examples of suitable matrixes include alumina, bentonite, biopolymers, calcium carbonate, calcium phosphate gel, carbon, cellulose, ceramic supports, clay, collagen, glass, hydroxyapatite, ion-exchange resins, kaolin, nylon, phenolic polymers, polyaminostyrene, polyacrylamide, polypropylene, polymerhydrogels, sephadex, sepharose, silica gel, and TEFLON-brand PTFE.

The catalyst may be coupled to the matrix (22) using adsorptive, ionic or covalent binding techniques. The catalyst can be used in its native form or it can be cross-linked or co-cross linked with other chemicals to enhance its activity. Alternatively, the catalyst can be entrapped in a gel or polymer matrix, stabilized in a micellar structure, incorporated into the substance of the matrix itself, or configured as a membrane reactor, e.g., by using a membrane-enclosed enzyme catalysis (MEEC) technique.

Figure 2:
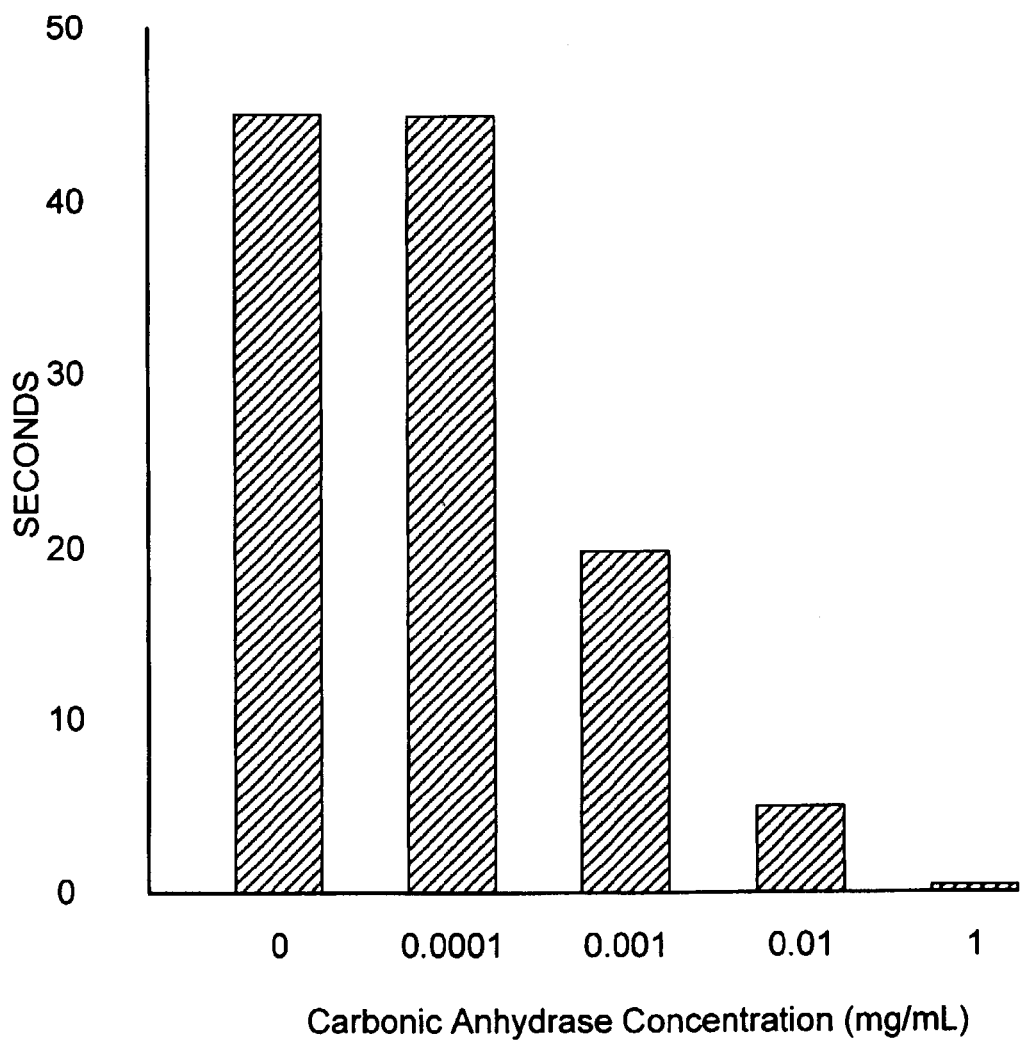
FIG. 2 is a graphical illustration of the effect of carbonic anhydrase on the time to convert the $CO_2$ to carbonic acid.

The effect of carbonic anhydrase on the reaction of $CO_2$ to carbonic acid is illustrated in FIG. 2. In this experiment, a chemical indicator that changes color as the amount of carbonic acid increases was used to measure the time to convert $CO_2$ into carbonic acid. It can be seen that the conversion of $CO_2$ to carbonic acid from changed from 45 seconds to less than 5 seconds depending on the amount of carbonic anhydrase added. In particular, as the concentration of carbonic anhydrase was increased, the time to convert the $CO_2$ to carbonic acid drastically decreased.

Once the carbonic acid is formed, it spontaneously forms an equilibrium with bicarbonate and carbonate ions, which is pH dependent. Base can then be added to shift the equilibrium to favor the formation of carbonate ions. In the final step, a mineral ion is added to a solution in a mineralization module (30) so that a precipitate of carbonate salt (32) is formed. Typically, calcium cations or magnesium cations are added to precipitate the carbonate salt. This solid mineral precipitate (32) has the ability to be safely stored for extended periods of time, such as by burying the precipitate (32) in the ground or depositing the precipitate (32) into storage sites either on land or into a body of water. Alternatively, the carbonic acid formed from $CO_2$ can be added to a carbonate slurry to form bicarbonate ions, which can then be deposited in the ocean with little environmental impact on the surroundings. In addition, naturally occurring brine and salt aquifers, which are rich sources of counter-ions (e.g. Ca++ and Mg++), can be used as deposition sites for the carbonic acid and/or bicarbonate and/or carbonate formed in the reaction.

The process set forth and generally described in FIG. 1 can be varied in many ways and the catalyst can be used differently depending on the configuration of the process. For example, the diffusion membrane may be altered so that the catalyst is bound directly to the gas exchange membrane. In addition, the catalyst can be cross-linked or co-cross linked with other chemicals to prolong its activity. Alternatively, the catalyst can be affixed to the membrane in a gel or polymer matrix or by being stabilized in a micellar structure. It can be incorporated into the substance of the membrane itself, or configured as a membrane reactor, e.g., by using membrane-enclosed enzyme catalysis (MEEC). By binding the catalyst to the gas diffusion membrane, the efficiency of $CO_2$ capture is increased compared to the membrane alone. For example, the catalyst enhances the specificity of the transfer of $CO_2$. Because the catalyst reacts specifically with $CO_2$, it favors the movement of $CO_2$ into the fluid by accelerating the reaction of the dissolved $CO_2$ and water to form carbonic acid, thereby removing $CO_2$ rapidly and allowing the dissolution of $CO_2$ from the gas from the feed stream into the water to a greater extent than it would otherwise. Because of these actions, the efficiency of the membrane-catalyst combination is greater than that of the membrane alone.

The catalyst increases the effectiveness of the gas diffusion membranes by enhancing the specificity of the reaction for $CO_2$. Because the catalyst specifically reacts with $CO_2$, other gases are left behind in the gas stream. In addition, the catalyst accelerates the reaction of the dissolved $CO_2$ and water to form carbonic acid, thereby removing $CO_2$, rapidly influencing mass flux, and causing the reaction to occur to a greater extent than it would otherwise.

Figure 3:
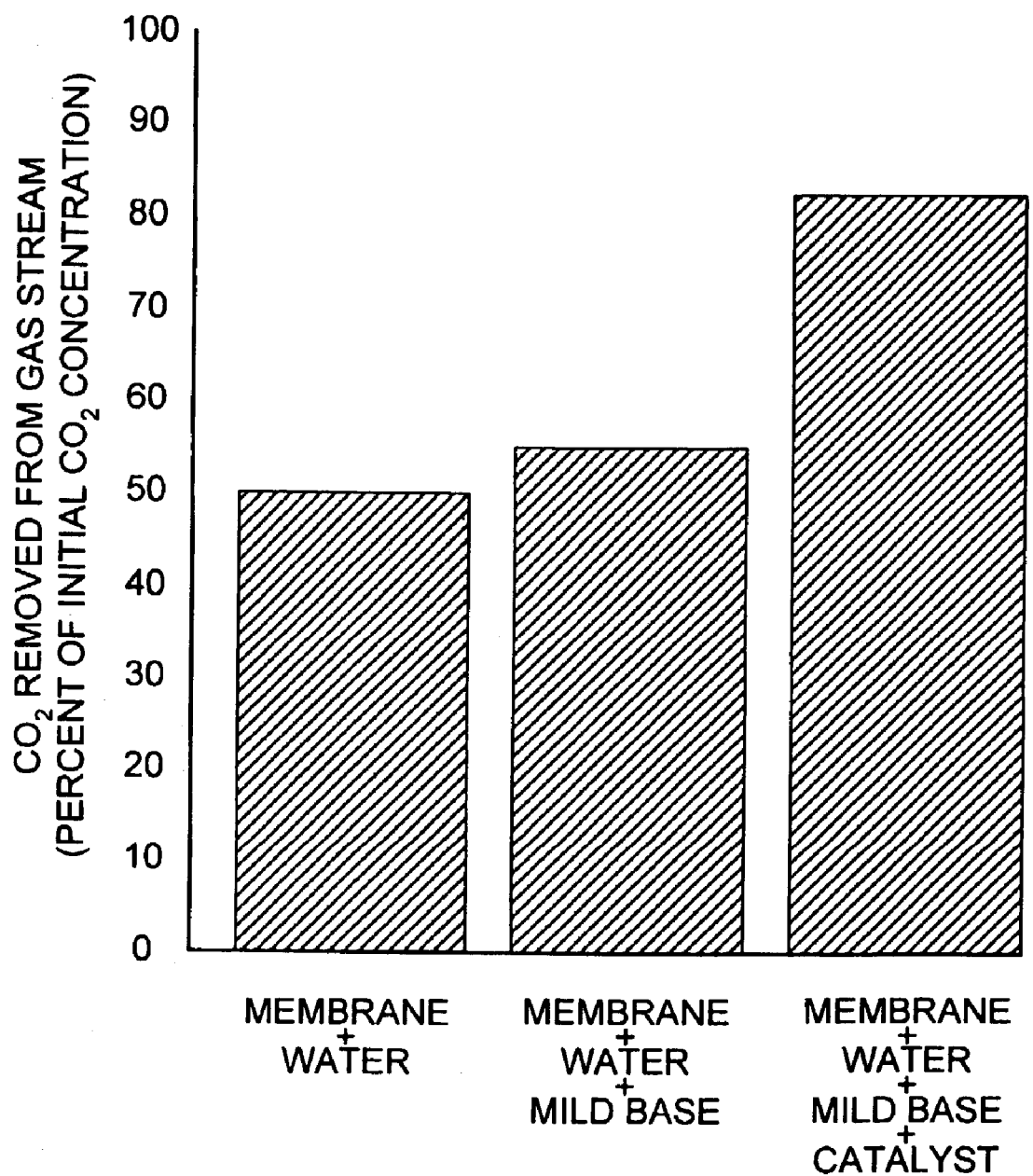
FIG. 3 is a graphical illustration of the effect of carbonic anhydrase on the ability of a polypropylene diffusion membrane to transfer $CO_2$ from a gas stream into a water stream.

The acceleration of the conversion of $CO_2$ to carbonic acid by carbonic anhydrase greatly enhances $CO_2$ capture compared to the capture efficiency of the membrane or to membrane plus base (see FIG. 3). When the liquid consisted of water only, 50% of the available $CO_2$ in the gas stream was captured. If the water is made mildly basic by the addition of hydroxide ions, it was determined that the efficiency increased by 5%. Although not wishing to be bound by theory, it is believed that this increase of efficiency is due to more favorable chemistry (i.e. the base reacts to convert the carbonic acid, thereby accelerating the rate at which $CO_2$ enters the water stream). It was also determined that if a catalyst was added to the mildly basic solution, the capture efficiency increased by more than 80%. The catalyst rapidly converted the $CO_2$ to carbonic acid which is transported downstream in the water flow. As a result, more $CO_2$ was able to diffuse across the membrane.

In an alternative embodiment, the process described above is altered to change the way in which anions that are generated from the dissolved $CO_2$ are collected, and concentrated. One approach is to collect and convert $CO_2$ predominately as bicarbonate, rather than carbonate as described above, by reducing the amount of base added. The bicarbonate ion can then be bound to an ion-exchange resin. The ions are then stripped from the resin using an anion that can bind to the resin, displace the bicarbonate, be easily removed after it has displaced the bicarbonate, and can be re-used. Suitable examples include, but are not limited to, chloride and hydroxyl ions. The result is a concentrated solution of the bicarbonate. The ions can then be precipitated using appropriate cations selected by one of skill in the art such as sodium, magnesium, or calcium ions. Alternatively, the bicarbonate ions can be collected using an ion exchange membrane. In this situation, the bicarbonate solution is passed through an ion exchange membrane, which transfers and concentrates the bicarbonate ions into a second solution. Another option is to concentrate the ions using reverse osmosis. The ions can then be precipitated using sodium, magnesium, calcium ions, or other suitable ions selected by one of skill in the art.

In yet another embodiment of the present invention, the carbonic acid that is formed is deposited onto a limestone ($CaCO_3$) bed. The limestone then reacts with the carbonic acid according to the following reaction: $H_2CO_3 + CaCO_3$ (solid) $\rightarrow Ca^{++} + 2HCO_3^-$. The bicarbonate that is formed may be released into rivers or coastal waters and be deposited eventually into ocean waters without harm to the environment. Alternatively, instead of depositing the solution of bicarbonate into the waterways, the solution can be collected. In this embodiment, the fluid can be made alkaline by adding base to the bicarbonate solution, which converts the bicarbonate that was originally produced into carbonate. This carbonate can then react with additional $Ca^{++}$ and/or $Mg^{++}$ to form a stable salt, which can then be collected and disposed of as a solid. Alternatively, the bicarbonate can be precipitated using an appropriate cation, such as sodium.

In a further alternate embodiment the $CO_2$ capture module and the conversion module are not employed. Instead, the carbonic anhydrase may be freely dissolved into a wet scrubbing system. In this alternative embodiment, the gas stream containing the $CO_2$ is bubbled through a solution in which the carbonic anhydrase is freely dissolved. The $CO_2$ dissolves into the water and then reacts with the catalyst (e.g., carbonic anhydrase) to rapidly form an acid product (e.g., carbonic acid). The acid product is then allowed to react as described above to form bicarbonate and carbonate ions, which are then precipitated using appropriate counter ions (e.g. Ca++, Mg++). In a further alternative embodiment the wet scrubbing system is used with the carbonic anhydrase attached to a matrix.

The processes described above for capturing $CO_2$ can also be used in hydrogen production, such as in hydrocarbon reforming. The production of hydrogen using the reforming process typically produces large amounts of $CO_2$. For example, during the process of using hydrocarbon reforming to produce hydrogen, a hydrocarbon feedstock is heated with steam at a high temperature to convert the hydrocarbon to CO and hydrogen. The CO then reacts with the steam to form $CO_2$ and additional hydrogen molecules. The inventive process may then be employed by passing the $CO_2$ and hydrogen through the $CO_2$ capture module, where the $CO_2$ is placed into solution by the action of the membrane. In addition, the hydrogen will diffuse into the water (albeit to a lesser extent than the $CO_2$) across the membrane. Preferably, experimental parameters are such that the $CO_2$ is rapidly diffused into the water so that the hydrogen has less time to diffuse into the water. One way to achieve this condition is to attach a carbonic anhydrase catalyst to the gas diffusion membrane and accelerate the reaction of dissolved $CO_2$ into carbonic acid. If the flow of gas across the membrane is very rapid, this reaction occurs quickly and the $CO_2$ is captured in the water medium before the hydrogen can cross the membrane and go into solution. This enhances the efficiency of the process of separating the $CO_2$ from the hydrogen. It also increases the yield of hydrogen recovered by preventing it from being lost to the water in the $CO_2$ capturing system and increases the amount of hydrogen that remains in the air stream.

Having generally described this invention, a further understanding can be obtained by reference to certain specific examples illustrated below which are provided for purposes of illustration only and are not intended to be all inclusive or limiting unless otherwise specified.

EXAMPLE

A gas exchange module containing a gas diffusion membrane was connected to a gas stream containing 10–40% $CO_2$. The gas flow was regulated between 1 and 9 L/min and the backpressure was maintained at 5 PSI. The gas exchange module was simultaneously connected to a water supply which was used to dissolve the $CO_2$. The flow of the water varied from 1–9L/min while the pressure was maintained at 10 PSI. At a $CO_2$ concentration of 30%, a gas flow of 7 L/min, and a water flow of 7 L/min, 75% of the mass of $CO_2$ gas from the feed stream was continuously collected into the water. Measurement of the $CO_2$ dissolved in the water indicated that 80–200 ml/L of $CO_2$ was present in the water as dissolved $CO_2$. The 25% of $CO_2$ that was not captured was released as exhaust. The water with the dissolved $CO_2$ then flowed over the carbonic anhydrase that was attached to a matrix and totally converted to carbonic acid. A 1 M solution of NaOH or KOH was then added to the solution at a rate of from 4–220 ml/min. As a result, most, if not all, of the carbonic acid was converted to carbonate ions. A 1 M solution of calcium chloride was then added at a rate of from 2.0–110 ml/min and calcium carbonate formed. The calcium carbonate precipitated from solution as a white solid. At least 25% of the mass of the $CO_2$ in the original feed stream is converted into calcium carbonate.

In another example, a gas concentrator is used which concentrates the $CO_2$ in ambient air from approximately 0.05 to approximately 0.25%. This concentration can be achieved by the use of zeolite granules, which can remove nitrogen from the air and concentrate the remaining atmospheric gases, including $CO_2$. This $CO_2$-enriched gas can then be subjected to the process described above to selectively remove $CO_2$ from the gas. The remaining gas may then be returned to the atmosphere.

The invention of this application has been described above both generically and with regard to specific embodiments. Although the invention has been set forth in what is believed to be the preferred embodiments, a wide variety of alternatives known to those of skill in the art can be selected

Having thus described the invention, what is claimed is:

1. A process for removing carbon dioxide from a gaseous stream comprising:
    diffusing gaseous carbon dioxide into water by passing the gaseous carbon dioxide through a gas diffusion membrane and a catalyst specific for carbon dioxide to accelerate a conversion of the carbon dioxide to carbonic acid supported by a matrix, wherein the matrix to which the catalyst is affixed comprises the gas diffusion membrane; and
    adding a mineral ion to form a precipitate of a salt of the carbonic acid.
2. The process according to claim 1, further comprising: forming bicarbonate ions from the carbonic acid.
3. The process according to claim 2, further comprising: adding a base to the bicarbonate ions to form carbonate ions.
4. The process according to claim 1, wherein the mineral ion is selected from the group consisting of sodium cations, calcium cations and magnesium cations.
5. The process according to claim 4, wherein the catalyst is carbonic anhydrase and the precipitate is selected from the group consisting of a carbonate salt and a bicarbonate salt.
6. A process for removing carbon dioxide from a gaseous stream comprising:
    placing the carbon dioxide into solution by passing the gaseous stream through a gas diffusion membrane;
    accelerating a conversion of carbon dioxide to carbonic acid by passing the carbon dioxide solution over a matrix that contains carbonic anhydrase, wherein the matrix comprises the gas diffusion membrane; and
    adding a mineral ion to form a precipitate of a salt of the carbonic acid.
7. The process according to claim 6, wherein the mineral ion is selected from the group consisting of calcium cations and magnesium cations.
8. The process according to claim 6 wherein the precipitate is a carbonate or a bicarbonate salt of a member selected from the group consisting of calcium, magnesium, and sodium.
9. A process for removing carbon dioxide from a gaseous stream comprising:
    obtaining gaseous carbon dioxide from a hydrocarbon reforming process;
    diffusing the gaseous carbon dioxide into water by passing the gaseous carbon dioxide through a gas diffusion membrane and a catalyst specific for carbon dioxide to accelerate a conversion of the carbon dioxide to carbonic acid supported by a matrix, wherein the matrix to which the catalyst is affixed comprises gas diffusion membrane; and
    adding a mineral ion to form a precipitate of a salt of the carbonic acid.
10. The process according to claim 9, further comprising: forming bicarbonate ions from the carbonic acid.
11. The process according to claim 10, further comprising: adding a base to the bicarbonate ions to form carbonate ions.
12. The process according to claim 9, wherein the mineral ion is selected from the group consisting of sodium cations, calcium cations and magnesium cations.
13. The process according to claim 9, wherein the catalyst is affixed to a porous membrane.
14. A process for removing carbon dioxide from a gaseous stream comprising:
    placing the carbon dioxide into solution by passing the gaseous stream through a gas diffusion membrane that contains a catalyst, the catalyst accelerating the conversion of the carbon dioxide to carbonic acid; and
    adding a mineral ion to form a precipitate of a salt of the carbonic acid.
15. The process of claim 14, further comprising: forming bicarbonate ions from the carbonic acid.
16. The process of claim 15, further comprising: adding a base to the bicarbonate ions to form carbonate ions.
17. The process according to claim 14, wherein the mineral ion is selected from the group consisting of sodium cations, calcium cations and magnesium cations.
18. The process according to claim 14, wherein the catalyst is carbonic anhydrase and the precipitate is selected from the group consisting of a carbonate and a bicarbonate salt.

* * * * *